United States Patent [19]

Hayes

[11] Patent Number: 4,761,908
[45] Date of Patent: Aug. 9, 1988

[54] PORTABLE HUNTING BLIND

[76] Inventor: Alphis H. Hayes, 4600 Old Troup Rd., Tyler, Tex. 75707

[21] Appl. No.: 84,914

[22] Filed: Aug. 13, 1987

[51] Int. Cl.⁴ ............................................. A01M 31/02
[52] U.S. Cl. ........................................................... 43/1
[58] Field of Search ................................. 43/1; 135/901

[56] References Cited

U.S. PATENT DOCUMENTS

| | | | |
|---|---|---|---|
| 1,031,851 | 7/1912 | January | 43/1 |
| 2,781,766 | 2/1957 | Krieger | 135/901 |
| 2,967,534 | 1/1961 | Silye | 135/901 |
| 3,082,780 | 3/1963 | Macy | 135/901 |
| 3,540,170 | 11/1970 | Flowers | 43/1 |
| 3,609,905 | 10/1971 | Fuhrman | 135/901 |
| 3,874,398 | 4/1975 | Hendrickson | 43/1 |
| 3,913,598 | 10/1975 | Glutting | 43/1 |
| 4,224,754 | 9/1980 | Derryberry | 43/1 |

Primary Examiner—Gene P. Crosby
Attorney, Agent, or Firm—Hubbard, Thurman, Turner & Tucker

[57] ABSTRACT

Disclosed is a portable hunting blind. The blind includes two or more separate hoops that are connected together by collapsible stays. The stays are movable between a collapsed position in which the hoops are closely adjacent each to each other and a substantially rigid extended position in which the hoops are spaced apart from each other to form a cylindrical framework. The hoops are covered by a flexible covering of canvas or the like.

12 Claims, 2 Drawing Sheets

PORTABLE HUNTING BLIND

BACKGROUND OF THE INVENTION

A. Field of the Invention

The present invention relates generally to portable enclosures and more particularly to a portable hunting blind.

B. Description of the Prior Art

In hunting certain types of game, the hunter stations himself in a hunting blind. Hunting blinds are typically fixed structures that conceal and provide shelter to the hunter while he waits for the game.

Typical hunting blinds are not readily transportable. Thus, when a hunter acquires a new hunting lease, he must normally construct one or more blinds in the area. The construction of a hunting blind requires transportation to the site of the building materials and a substantial amount of labor. There have been proposals for portable hunting blinds that the hunter could carry with him into and out of the field; however, these proposals have not been entirely satisfactory. Examples of such portable blinds and shelters are disclosed in U.S. Pat. Nos. 4,224,754 Dewrryberry, 3,082,780 Macy, 2,967,534 Silye, and 2,781,766 Kreiger.

SUMMARY OF THE INVENTION

The hunting blind of the present invention includes two or more separate hoops that are connected together by collapsible stays. The stays are movable between a collapsed position in which the hoops are closely adjacent to each other so as to be readily portable, and a substantially rigid extended position in which the hoops are spaced apart to form a cylindrical framework. The hoops are covered by a flexible covering of canvas or the like.

DESCRIPTION OF THE PREFERRED EMBODIMENT

Figure 1:
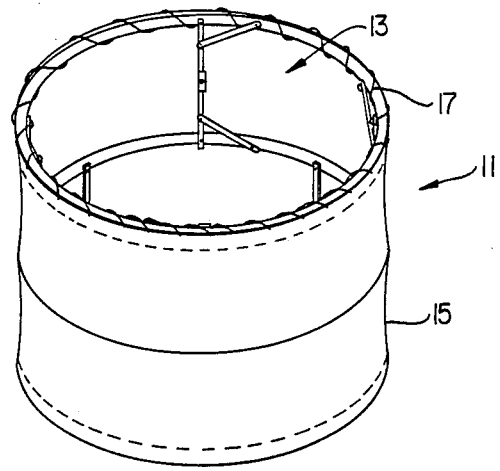
FIG. 1 is a perspective view of the hunting blind of the present invention.

Referring to the drawings, as shown in FIG. 1, the portable hunting blind of the present invention is designated generally by the numeral 11. Hunting blind 11 includes a collapsible support frame structure designated generally by the numeral 13 that is covered by a tubular covering 15. Covering 15 is preferably of a flexible lightweight material such as lightweight canvas or a dense fabric mesh. The material of covering 15 is selected so as to provide concealment to the hunter but be light in weight in order to making hunting blind 11 readily transportable. Tubular covering 15 may be printed with a camouflage pattern so as to increase its effectiveness in concealing the hunter. Tubular covering 15 is conveniently laced to collapsible frame structure 13 by a lace 17, but those skilled in the art will recognize other methods of attaching the covering to the frame.

Figure 2:
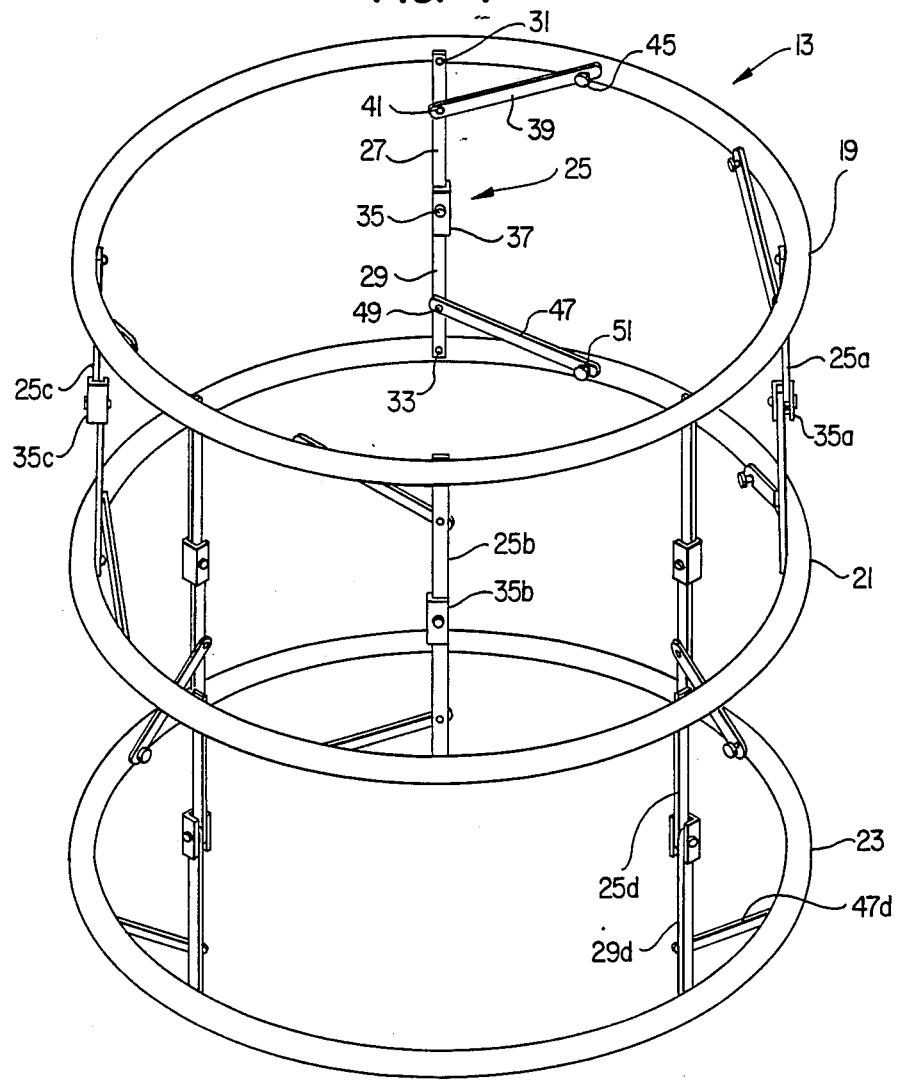
FIG. 2 is a perspective view of the frame structure of the present invention in the extended position.
Figure 3:
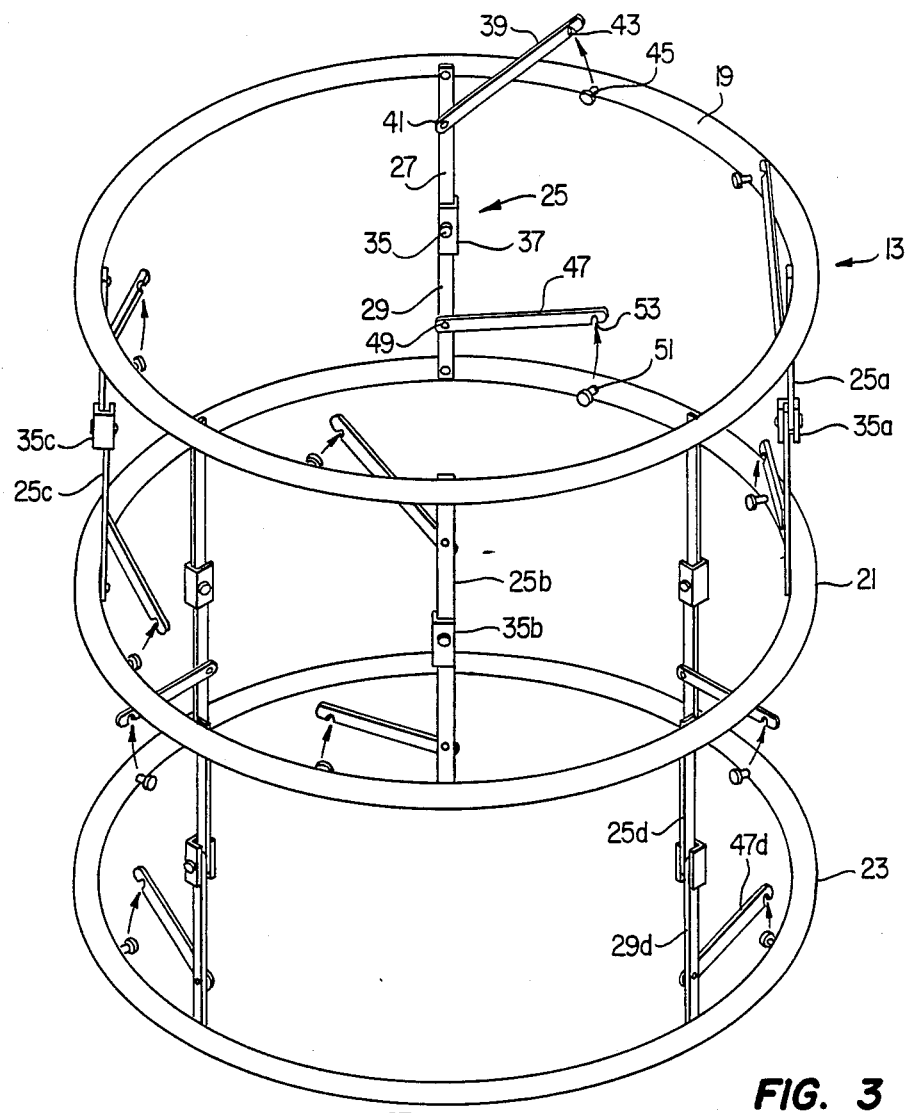
FIG. 3 is a perspective view of the frame of the present invention immediately prior to its being collapsed.
Figure 4:
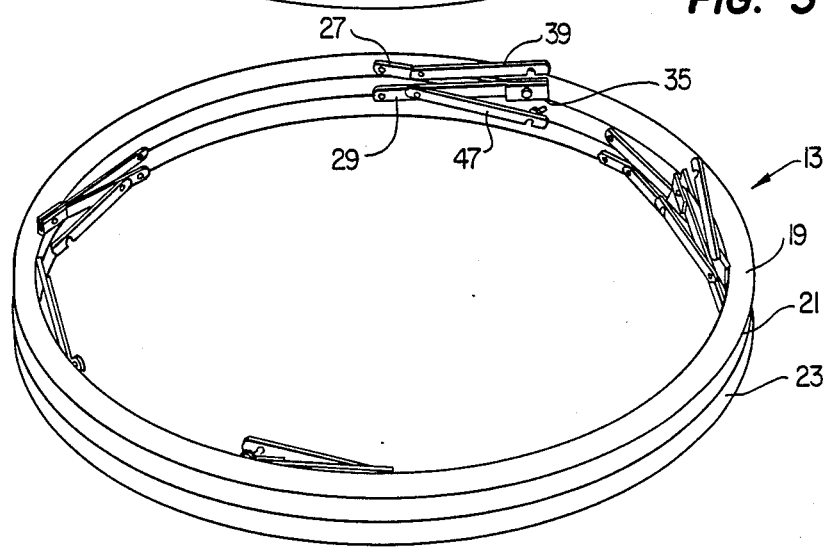
FIG. 4 is a perspective view of the frame of the present invention in the collapsed position.

As best shown in FIGS. 2-4, support frame 13 includes at least two separate hoops and in the preferred embodiment support frame 13 includes three separate hoops 19, 21, and 23. The hoops are made of a lightweight durable material, which in the preferred embodiment is PVC pipe that has been bent into and fastened in a circle.

Hoops 19-23 are connected together by a plurality of collapsible stays designated generally by the numeral 25. Each collapsible stay 25 includes a first stay member 27 pivotally connected to one of the hoops and a second stay member 29 connected to another hoop. In the examples of the drawings, first stay member 27 is pivotally connected to hoop 19 by a pin 31 and second stay member is pivotally connected to hoop 21 by a pin 33. Stay members 27 and 29 are connected to each other by a pin 35, which forms a hinge.

Stays 25 are thus movable between an extended position as shown in FIGS. 2 and 3 and a collapsed position as shown in FIG. 4. In the extended position, stays 25 are made substantially rigid and preventive from pivoting substantially past 180 degrees with respect to each other by a channel member 37. Channel member 37 is positioned about the hinge formed by pin 35 and allows stay 25 to collapse toward the right as shown in the drawings but prevents stay 25 from collapsing toward the left.

Stays 25 are locked in their extended positions by at least one brace member 39. Brace member 39 is pivotally connected to first stay member 27 by a pin 41. Brace member 39 is detachably connected to hoop 19 by the engagement of a slot 43, which is best shown in FIG. 3, with a pin 45. When slot 43 is engaged with pin 45, first stay member 27 is rigidly extended perpendicular to the plane formed by hoop 19.

A second brace member 47 is pivotally connected to second stay member 29 by a pin 49. Second brace member 47 is detachably connected to hoop 21 by a pin 51 and slot 53.

The stays that connect hoops 19 and 21 are spaced substantially equally spaced apart about the circumferences of the hoops. In the preferred embodiment, each of the hoops is connected together by four stays so the stays are spaced substantially 90 degrees apart from each other. It will be noted that the stays are arranged such that adjacent stays collapse in opposite directions. For example, the channel member 35a of stay 25a is arranged such that stays 25 and 25a collapse toward each other. Similarly, the channel section 35b of stay 25b is arranged such that stays 25a and 25b collapse away from each other. Finally, the channel member 35c of stay 25c is arranged such that stays 25b and 25c collapse towards each other and stays 25 and 25c collapse away from each other. The alternating collapse directions of the stays contributes to the rigidity of support frame 13. Thus, when stays 25 are extended and brace members 39 and 47 are connected to hoops 19 and 21, a very rigid but lightweight structure is formed.

In similar fashion, hoops 21 and 23 are connected together by four stays spaced 90 degrees apart. As shown in the drawings, the stays connecting hoops 21 and 23 are displaced circumferentially from those connecting hoops 19 and 21. The circumferential displacement allows for better collapse of the structure, as shown in FIG. 4. It has been found that the structure has sufficient rigidity when there is only one brace member provided for the stays connecting the lower hoops. Thus, stay 25d has only a single brace member 47d connecting second stay member 29d and hoop 23.

However, if desired a brace member may be placed between stay 25d and hoop 21.

In operation, hunting blind 11 may be stored and carried about in the collapsed position as shown in FIG. 4. It will be recognized that hunting blind 11 includes flexible covering 15, which is not shown in FIG. 4, but which collapses with frame structure 13. When the hunter arrives at the hunting site, he errects frame structure 13 simply by pivoting collapsible stays 25 to the extended position and locking them in place by the engagement of brace members 39 and 47 with their associated hoops. The hunter conceals himself in hunting blind 11 by crouching, or if he desires, by sitting on a stool or chair or the like. The height and width of hunting blind 11 are selected according to the hunter's wishes.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features may be used independently of other features, all as would be apparent to one skilled in the art after having the benefit of this description of the invention.

What is claimed is:

1. A portable hunting blind, which comprises:
   a first hoop;
   a second hoop;
   a plurality of collapsible stays connected between said first and second hoops at substantially equally spaced apart locations about the circumferences of said hoops, each of said collapsible stays being movable between a substantially rigid extended position in which said first and second hoops are spaced apart from each other and a collapsed position in which said hoops are closely adjacent each other;
   a third hoop;
   and a plurality of collapsible stays connected between said third hoop and said second hoop at substantially equally spaced apart locations about the circumference of said hoops, wherein said stays connecting said first and second hoops are circumferentially displaced from said stays connecting said second and third hoops.

2. The portable hunting blind as claimed in claim 1, wherein of each of said collapsible stays comprises:
   a first stay member pivotally connected to one of said hoops;
   a second stay member pivotally connected to another of said hoops;
   and means for connecting together said first and second stay members.

3. The portable hunting blind as claimed in claim 2, wherein said means for connecting together said first and second stay members includes hinge means for pivotally joining said first and second stay members.

4. The portable hunting blind as claimed in claim 3, including means for preventing said first and second stay members from pivoting substantially past 180 degrees with respect to each other.

5. The portable hunting blind as claimed in claim 4, wherein said preventing means includes a channel member positioned about said hinge means.

6. The portable hunting blind as claimed in claim 3 including means for locking said stays in said extended position.

7. The portable hunting blind as claimed in claim 6, wherein said locking means includes a brace member detachably connected between at least one of said first and second stay members and its associated hoop.

8. The portable hunting blind as claimed in claim 7, wherein said locking means further includes means for preventing said first and second stay members from pivoting substantially past 180 degrees with respect to each other.

9. The portable hunting blind as claimed in claim 8, wherein said preventing means includes a channel member positioned about said hinge means.

10. The portable hunting blind as claimed in claim 1, wherein each of said collapsible stays includes:
    a first stay member pivotally connected to one of said hoops;
    a second stay member pivotally connected to said first stay member and to another of said hoops;
    and a channel member positioned about said first and second stay members to prevent said first and second stay members from pivoting substantially past 180 degrees with respect to each other.

11. The portable hunting blind as claimed in claim 10, including a brace member detachably connected between at least one of said first and second stay members and its associated hoop.

12. The portable hunting blind as claimed in claim 1, including a flexible covering connected between said first and third hoops.

* * * * *